(12) United States Patent
Okanoue

(10) Patent No.: US 6,307,843 B1
(45) Date of Patent: Oct. 23, 2001

(54) AD HOC NETWORK OF MOBILE HOSTS USING LINK TABLE FOR IDENTIFYING WIRELESS LINKS AND DESTINATION ADDRESSES

(75) Inventor: Kazuhiro Okanoue, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/118,758

(22) Filed: Jul. 17, 1998

(30) Foreign Application Priority Data

Jul. 18, 1997 (JP) .................................................. 9-209878

(51) Int. Cl.[7] ................................. H04Q 7/24; H04J 3/16
(52) U.S. Cl. .......................... 370/312; 370/338; 370/390; 370/469; 455/453
(58) Field of Search ..................................... 370/312, 329, 370/331, 338, 349, 351, 390, 401, 469; 709/222; 455/450, 453, 445

(56) References Cited

U.S. PATENT DOCUMENTS

| | | | |
|---|---|---|---|
| 5,412,654 | * 5/1995 | Perkins | 370/312 |
| 5,987,011 | * 11/1999 | Toh | 370/331 |
| 6,130,892 | * 10/2000 | Short et al. | 370/401 |
| 6,134,587 | * 10/2000 | Okanoue | 370/338 |

FOREIGN PATENT DOCUMENTS

| | | |
|---|---|---|
| 7-336370 | 12/1995 | (JP) . |
| 8-37535 | 2/1996 | (JP) . |
| 8-79269 | 3/1996 | (JP) . |
| 8-125662 | 5/1996 | (JP) . |
| 8-125663 | 5/1996 | (JP) . |
| 8-242245 | 9/1996 | (JP) . |
| 8-242246 | 9/1996 | (JP) . |
| 8-251171 | 9/1996 | (JP) . |
| 9-8828 | 1/1997 | (JP) . |
| 9-130391 | 5/1997 | (JP) . |
| 9-139747 | 5/1997 | (JP) . |
| 9-186690 | 7/1997 | (JP) . |
| 10-23028 | 1/1998 | (JP) . |
| 10-23068 | 1/1998 | (JP) . |

\* cited by examiner

*Primary Examiner*—Alpus H. Hsu
*Assistant Examiner*—Afsar M. Qureshi
(74) *Attorney, Agent, or Firm*—Scully, Scott, Murphy & Presser

(57) ABSTRACT

In an ad hoc network of mobile hosts interconnectable by a number of wireless links, each mobile host includes a link table having a multiple entries each comprising a host name, a link identifier indicating one of the wireless links, a network layer address and a data link layer address. Each of the mobile hosts comprises a link table having a plurality of entries each comprising a host name, a link identifier indicating one of the wireless links, a network layer address and a data link layer address. Each mobile host is responsive to an entered destination host name for making a search through the link table, transmitting a frame containing the network layer and data link layer addresses of an entry of the link table on one of the wireless links which is indicated by the link identifier of this entry if this entry contains the destination host name. If the link table does not contain the destination host name, the mobile host scans the wireless links, broadcasts a link table request message on one of the scanned wireless links, receives a remote link table containing the destination host name, and transmits a frame containing network layer and data link layer addresses of the received link table on the wireless link on which the remote link table was received.

13 Claims, 7 Drawing Sheets

LINK TABLE

| HOST NAME | WIRELESS LINK IDENTIFIER | IP ADDRESS | | DLL ADDRESS | CACHE PERIOD |
|---|---|---|---|---|---|
| | | NTWK ADRS | HOST ADRS | | |
| | | | | | |
| | | | | | |
| ⋮ | ⋮ | ⋮ | ⋮ | ⋮ | ⋮ |
| | | | | | |

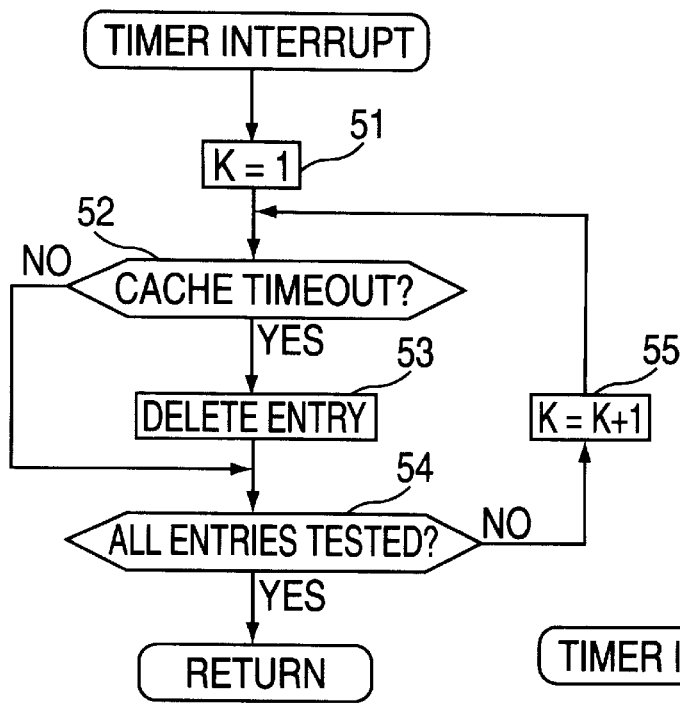
FIG. 5
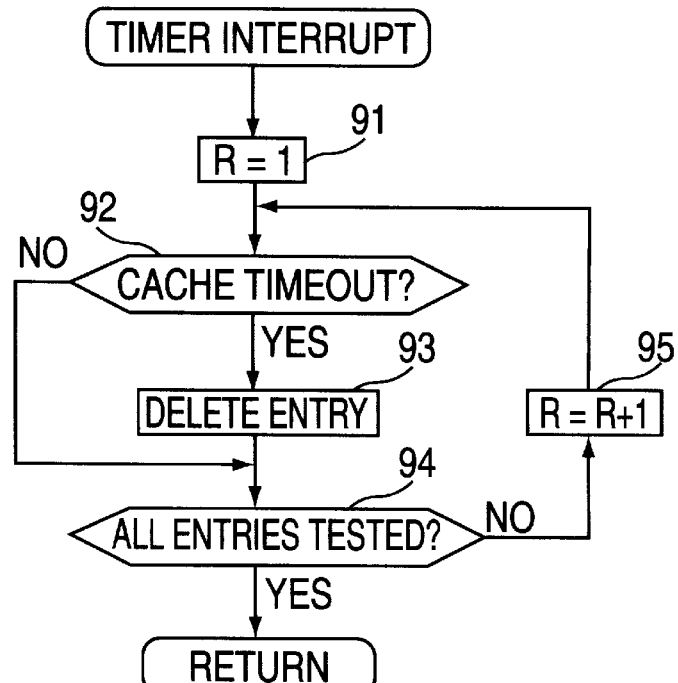
FIG. 9
| NTWK ADDRESS | IP ADDRESS OF ROUTERS (GTWY'S) | CACHE PERIOD |
|---|---|---|
| | | |
| | | |
| ⋮ | ⋮ | ⋮ |
| | | |
FIG. 7

AD HOC NETWORK OF MOBILE HOSTS USING LINK TABLE FOR IDENTIFYING WIRELESS LINKS AND DESTINATION ADDRESSES

BACKGROUND OF THE INVENTION

1. Field of the Invention

The present invention relates generally to wireless networks, and more specifically to an ad hoc network in which mobile hosts are connected to each other via direct wireless links.

2. Description of the Related Art

An ad hoc network is a collection of wireless mobile hosts forming a temporary network without the aid of any centralized routing facility. Japanese Patent Laid-Open Specification Hei-8-37535 describes routing in an ad hoc network by having each mobile host maintain a routing table in which IP (network layer) addresses of destination hosts are mapped to IP addresses of transit hosts. When source and destination hosts are outside of the range of each other but within the range of a transit host, the latter acts as a router for routing packets between the source and destination hosts.

If mobile hosts were to use a number of wireless links to form an ad hoc network, these mediums would be identified by data link layer addresses in the routing table. Since the source host has no way of knowing which wireless link every other host is actually using, it will have to establish all wireless links and then broadcast a query packet to all destinations. However, this results in a low utilization efficiency of the network resource.

Another problem is that if mobile hosts having IP addresses of different network addresses were to form an ad hoc network, connections can only be established between mobile hosts of the same network address due to the lack of such routers and gateways of the type as used in wired backbone networks.

SUMMARY OF THE INVENTION

It is therefore an object of the present invention to provide an ad hock network that allows efficient utilization of wireless links with which mobile hosts are interconnected.

According to a first aspect of the present invention, there is provided an ad hoc network comprising a plurality of mobile hosts interconnectable by a plurality of wireless links. Each of the mobile hosts comprises a link table having a plurality of entries each comprising a host name, a link identifier indicating one of the wireless links, a network layer address and a data link layer address. Each mobile host is responsive to an entered destination host name for detecting an entry of the link table in which the destination host name is contained, transmitting a frame containing the network layer and data link layer addresses of that entry on one of the wireless links which is indicated by the link identifier of that entry.

According to a second aspect, the present invention provides an ad hoc network comprising a plurality of mobile hosts interconnectable by a plurality of wireless links. Each of the mobile hosts comprises a link table having a plurality of entries each comprising a host name, a link identifier indicating one of the wireless links, a network layer address and a data link layer address. Each mobile host is responsive to an entered destination host name for making a search through the link table for an entry containing the destination host name. If such an entry is found, the mobile host transmits a frame containing the network layer and data link layer addresses of the entry on the wireless link indicated by the link identifier of the entry. Otherwise, the mobile host scans the wireless links, broadcasts a link table request message on one of the scanned wireless links, receives a remote link table containing the destination host name, and transmits a frame containing network layer and data link layer addresses of the remote link table on the wireless link on which the remote link table was received.

BRIEF DESCRIPTION OF THE DRAWINGS

The present invention will be described in further detail with reference to the accompanying drawings, in which:

FIG. 5 is a flowchart of a timer interrupt routine performed by the mobile host to delete an expired entry from the link table;

FIG. 7 shows a routing table maintained by the mobile host and updated according to router advertisement messages;

FIG. 9 is a flowchart of a timer interrupt routine performed by the mobile host to delete an expired entry from the routing table.

DETAILED DESCRIPTION

Figure 1:
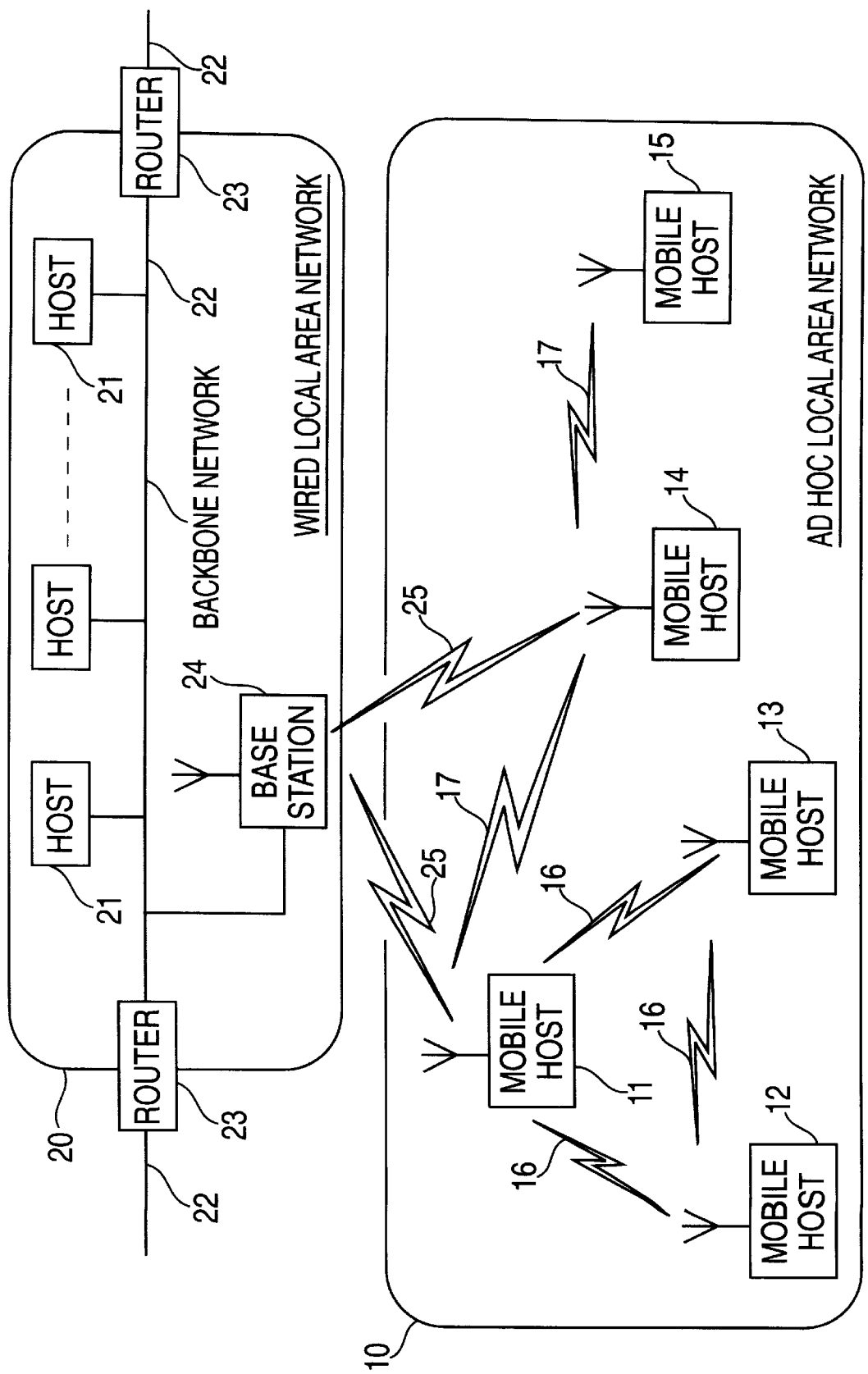
FIG. 1 shows an exemplary ad hock local area network of the present invention and a wired local area network.

In FIG. 1, an ad hoc local area network 10 of the present invention is temporarily formed of multi-channel wireless mobile hosts 11 to 15. Each of these wireless mobile hosts is uniquely identified by an IP address (i.e., a network layer address consisting of a network address and a host address) and a data link layer address. Each mobile host has a frequency synthesizer to selectively establish one of a predetermined number of two-way wireless links (two-way channels) within the ad hock LAN 10. The mobile hosts within the ad hoc LAN 10 know which wireless links are available for establishing a connection. In the illustrated example, the mobile hosts 11 to 13 form a first mobile group using a two-way wireless link 16 and the mobile hosts 14 and 15 form a second mobile group using a two-way wireless link 17.

Figures 2, 4:
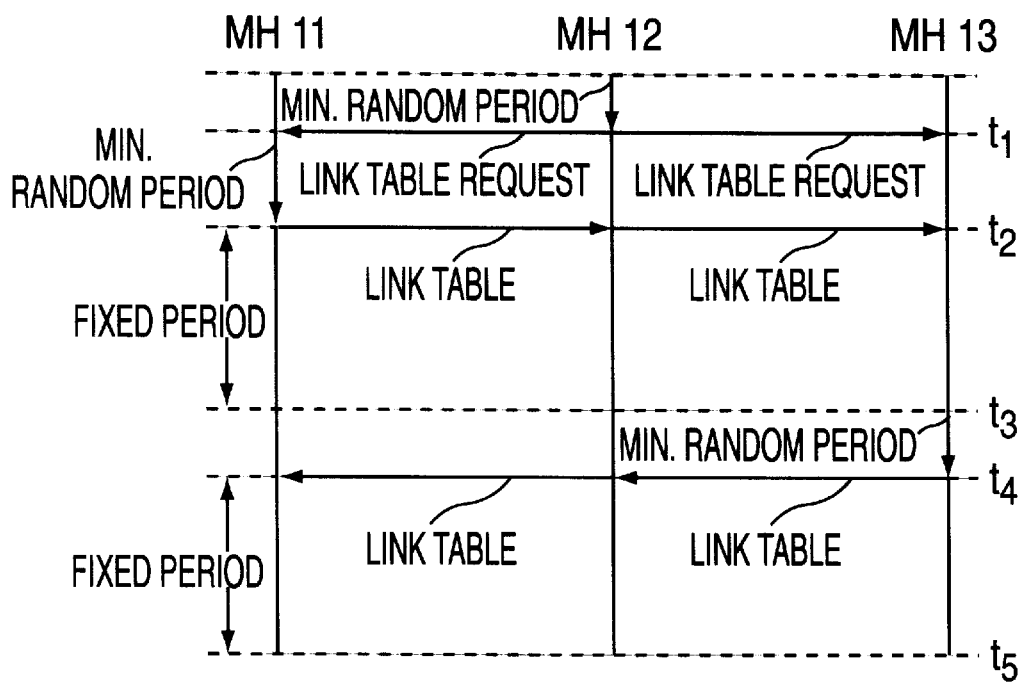
FIG. 2 shows a link table maintained in each mobile host of the ad hoc local area network as a list of addresses of other mobile hosts.
FIG. 4 is a time sequence diagram of a link table request and subsequent link table broadcasts.
Figure 3:
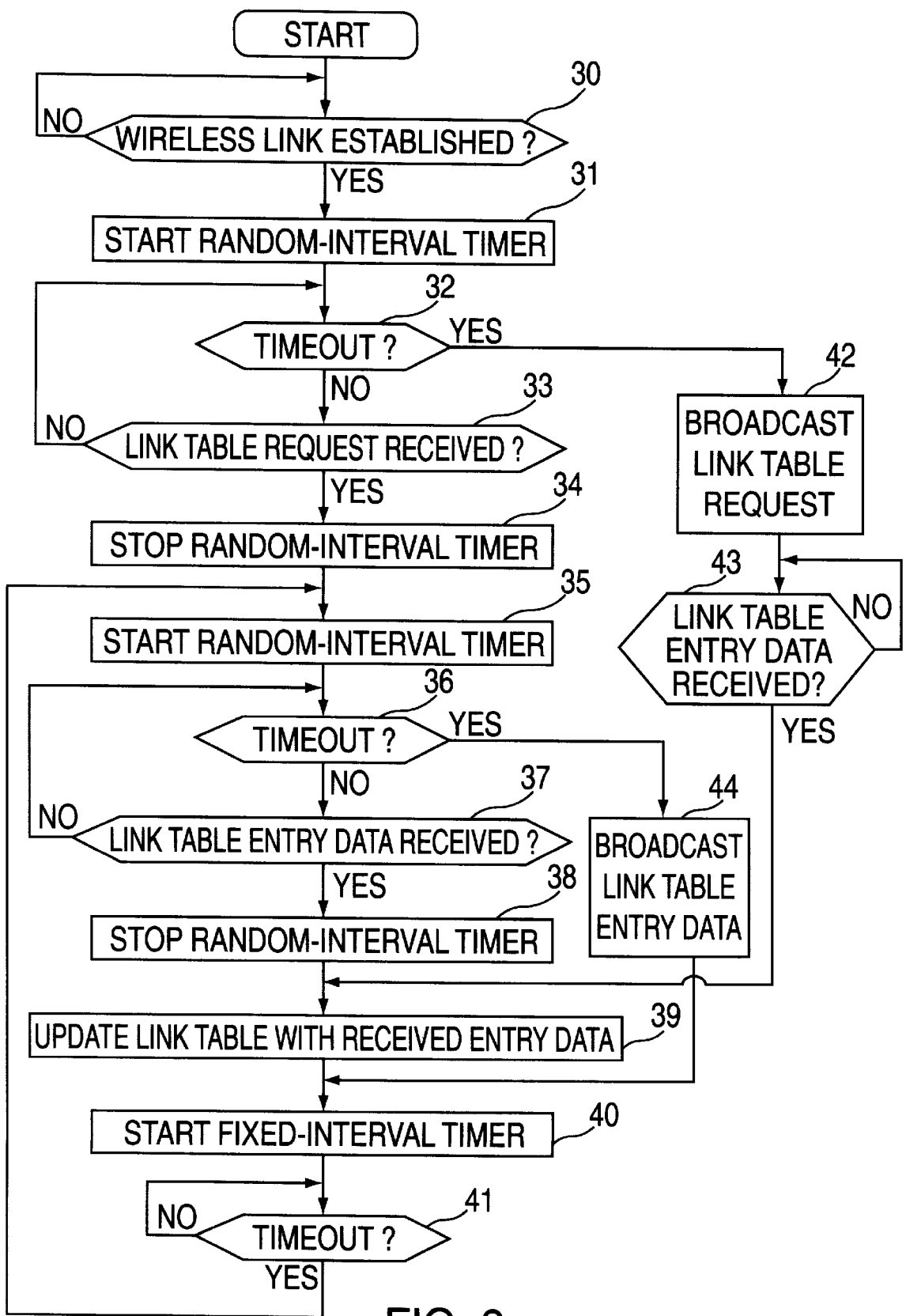
FIG. 3 is a flowchart of a programmed routine performed by the mobile host when a link table is saved in memory or updated.

When mobile hosts of this invention form a group for wireless communication, each of these hosts creates a link table of FIG. 2 and periodically updates it by performing a programmed routine as illustrated in the flowchart of FIG. 3.

The link table of each mobile host has an entry reserved for storing data of its own mobile host and a plurality of other entries for storing data of other mobile hosts. Each entry of the link table has a number of fields in which a host name, a wireless link identifier, an IP address, a data link layer address and a cache period are respectively indicated. The link identifier of each entry indicates the wireless link to which the mobile host of the entry is connected.

The program execution of each mobile host starts with step 30 when a wireless link is established among mobile hosts of a group. At step 31, a random-interval timer is started and the mobile host checks to see if the random-interval timer expires (step 32). If de timer is still running, flow proceeds from step 32 to step 33 to check to see if a link table request is received. If not, flow returns from step 33 to step 32. If the random-interval timer expires earlier than a link table request is received, it is determined that no link table request has been broadcast from other mobile hosts and flow proceeds from step 32 to step 42 to broadcast a link table request message on the established wireless link.

On the other hand, every other mobile host receives this link table request (step 33) and stops the random-interval timer at step 34 and then restarts the random-interval timer at step 35, determines whether it expires at step 36. If it is not, flow proceeds from step 36 to step 37 to check to see if a link table is received. If not, flow returns from step 37 to step 36. Therefore, when the random-interval timer of one of the other mobile hosts expires at step 36, this mobile host broadcasts, at step 44, its link table containing its own entry as well as the entries of other mobile hosts.

The broadcast link table is received at step 43 by the mobile host which has issued the link table request. The mobile hosts other than those which have transmitted the link table request or a link table itself receive the broadcast link table at step 37 and proceed to step 38 to stop their random-interval timer. The mobile hosts other than the host that has broadcast the link table at step 44 proceed to step 39 to update their link table with the received remote table. This updating step involves comparison of each entry of the received link table with all entries of the local link table for a mismatch. If a received entry mismatches with any entry of the local link table, it is added as a new entry to the local link table and the cache period of this entry is set to a predetermined initial value. If it matches with a local entry, the cache period of the local entry is reset to its initial value. The local entry is deleted from the link table if its cache period expires.

At step 40, all the mobile hosts start a fixed-interval timer. When the fixed-interval timer expires (step 41), all the mobile hosts return to step 35 to start the random-interval timer at the same time to exchange and update their link tables at random intervals.

If the mobile host 12 is the earliest to expire its random-interval timer at step 32, it broadcasts a link table request at time $t_1$ as shown in FIG. 4 and the mobile hosts 11 and 13 receive this request at step 33, stop their random-interval timers at step 34 and restart them at step 35. If, at step 36, the mobile host 11 is the earliest to expire its random-interval timer, it broadcasts its link table at time $t_2$ (step 44). Thus, mobile hosts 12 and 13 receive the link table from the mobile host 11 (step 37), stop their random-interval timer (step 38) and save the received link table (step 39). Thus, all the mobile hosts define the starting point of the fixed-interval timers at step 40 substantially at the same time. At time $t_3$, the fixed-interval timers of all the mobile hosts expire (step 41) and their random-interval timers are again restarted (step 35). At time $t_4$, if the mobile host 13 is the earliest to expire its random-interval timer (step 36), it broadcasts its link table (step 44), setting the fixed-interval timer (step 40) which expires at time $t_5$ (step 41). Since in each mobile host the random-interval timer varies in a range between zero and some finite value, the fixed-interval timer defines the minimum interval between successive link table updates.

As described earlier, the data transmitted with a link table contains a cache period in each mobile host entry. This cache period indicates the amount of time remaining for the mobile host of that entry to be accessed from other mobile hosts using the same wireless link. This period is greater than the period set by the fixed-interval timer. The time value set in the cache period field of each entry is decremented at regular intervals.

The main routine is periodically interrupted to initiate a timer interrupt routine to check the validity of each entry of the link table as shown in FIG. 5. At step 51, a variable K indicating the number of entries created in the link table is set equal to 1. At step 52, the time value in the cache period of the entry K is checked to see if it has decremented to zero. If so, flow proceeds from step 52 to step 53 to delete the entry K. The variable K is then incremented by 1 at step 55 if all the entries still have not been tested (step 54), and flow returns to step 52 to repeat the process until all the entries are tested.

Figure 6:
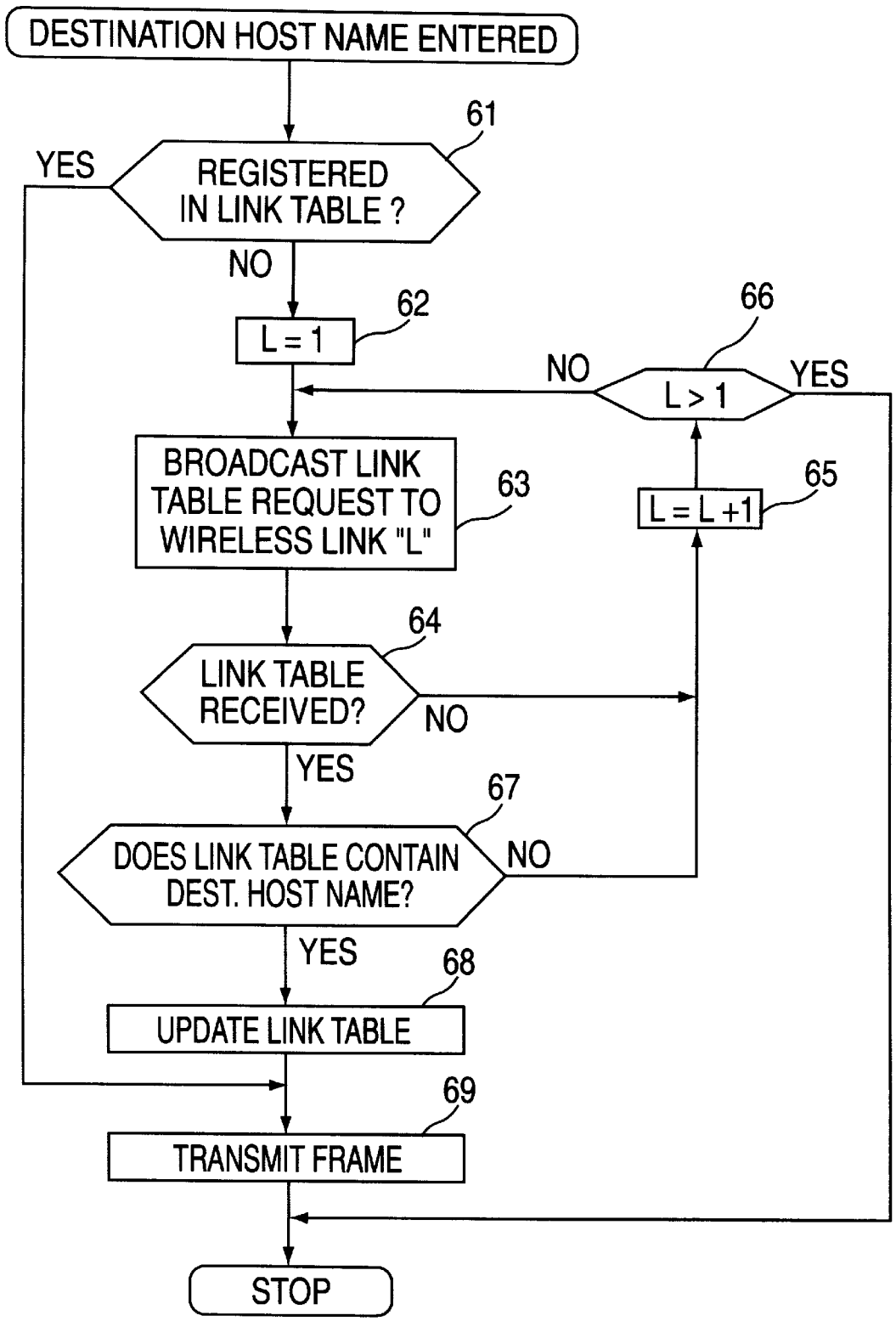
FIG. 6 is a flowchart of a programmed routine performed by the mobile host when a connection is established within the ad hoc local area network in response to a call setup request.

When a destination host name is entered on a source mobile host wishing to establish a connection, a routine of FIG. 6 is initiated with step 61 where each entry of the link table of the source mobile host is searched for the destination mobile host name. If the destination host name is found in one of the entries of the link table, the source host proceeds from step 61 to step 69 to formulate a frame using IP and data link layer addresses contained in that entry and establishes a wireless link identified by the link identifier of that entry and broadcasts the frame on the established wireless link.

Due to the use of the link table, connections can be directly established between multi-channel mobile hosts of an ad hoc network even though their IP addresses have different network addresses from each other.

If the search for a destination host name fails, it is determined that the destination host is using a wireless link other than that registered in the link table and flow proceeds from step 61 to step 62 to set a variable L to 1. Flow proceeds to step 63 to broadcast a link table request message on a wireless link that corresponds to the variable L. The source mobile host then proceeds to step 64 and checks to see if a link table is received on the wireless link L. If not, flow proceeds to step 65 to increment the variable L by 1 and the variable is checked at step 66 to see if L is greater than N which is the number of wireless links available within the ad hock network. If L is greater than N, flow proceeds to the end of the routine. If L is equal to or smaller than N, flow proceeds to step 63 to repeat the process.

If a link table is received on the wireless link L (step 64), the source host proceeds to step 67 and checks to see if the received link table contains the destination host name. If not, the variable L is incremented at step 65 and compared with N (step 66). If the destination host name is contained in the received link table of the wireless link L, flow proceeds from step 67 to step 68 to update the link table of the source host with the received link table in the same manner as described in connection with the updating step 39 of FIG. 3. At step 69, the source mobile host transmits a frame containing the address data of the destination host contained in the received link table on the wireless link L.

In this way, if the mobile host 11 has established a connection to the mobile host 14, the link table of the mobile hosts 14 and 15 is obtained. Thereafter, the mobile host 11 executes steps 35 to 41 of FIG. 3 to repeatedly exchange its link table with those of the mobile hosts 14 and 15.

According to a further aspect of the present invention, the ad hoc LAN 10 may be connected by a wireless link to a wired local area network 20 as illustrated in FIG. 1. The wired LAN 20 is formed of desktop computer hosts 21 connected to a backbone network 22 connected to remote LANs via inter-LAN connecting devices 23 such as routers (or gateways). Connected to the backbone network 22 is a base station 24 for establishing two-way wireless links 24 between the wired LAN 20 and the ad hoc LAN 10.

As shown in FIG. 7, each mobile host has, in addition to the link table, a routing table for mapping network addresses to the IP addresses of neighboring routers (or gateways) which are advertised at periodic intervals from the wired LAN 20 with "router advertisement messages". Using the routing table of FIG. 7, each mobile host operates according to the flowcharts of FIGS. 8 and 9.

Figure 8:
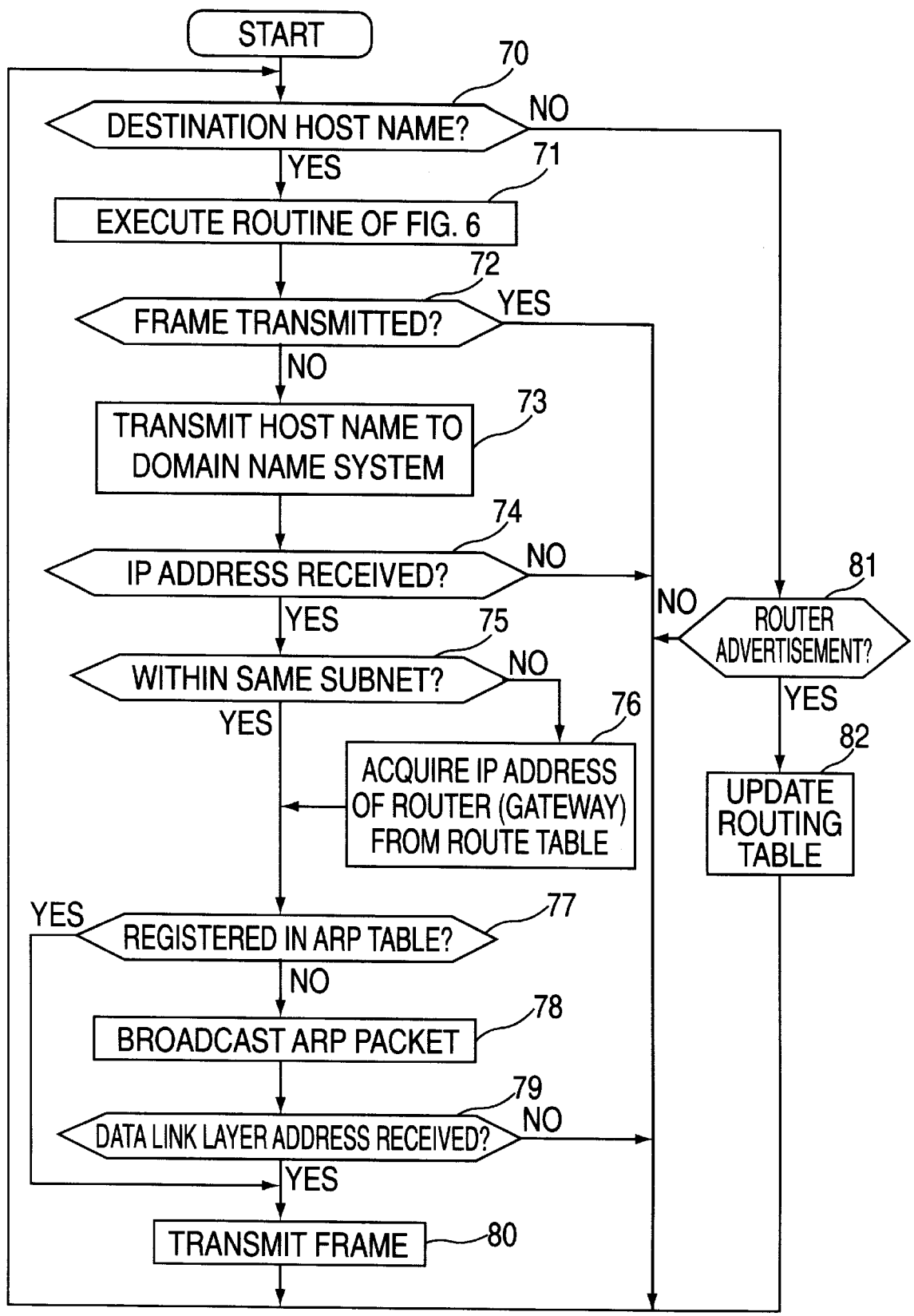
FIG. 8 is a flowchart of a programmed routine performed by the mobile host when a connection is established within the ad hoc local area network as well as in the wired local area network in response to a call setup request and when the routing table is updated.

In FIG. 8, each mobile host checks to see if a destination host name is entered (step 70). If not, flow proceeds from step 70 to step 81 to check to see if a router advertisement message is received. If it is, the mobile host updates the routing table at step 82 and returns to the starting point of the routine. The mobile host returns from step 81 to the starting point when router advertisement message is not received.

If a destination host name is entered, flow proceeds from step 70 to step 71 to determine whether the entered host name is registered in the link table. If so, the mobile host executes the routine of FIG. 6. At step 72, it is determined whether a frame is successfully transmitted. If a frame is successfully transmitted at step 72, the destination is within the same ad hoc network as the source host and flow returns from step 72 to the starting point of the routine.

If it is determined that there is no frame transmission at step 72, the destination may be connected to the wired LAN, and flow proceeds to step 73 to transmit the destination host name to the Domain Name System. The mobile host waits for a response from the DNS at step 74. If an IP address is received from the DNS (step 74), flow proceeds to step 75 to check the IP address to see if the destination shares the same subnetwork with the source mobile host.

If the destination is outside of the subnetwork of the source mobile host, flow proceeds from step 75 to step 76 to acquire the IP address of a neighboring router (or gateway) from the routing table and proceeds to step 77. If the destination is on the same subnetwork, flow proceeds direct from step 75 to step 77.

At step 77, the source mobile host checks to see if the IP address is registered in an ARP (address resolution protocol) table in which Ip addresses are mapped to data link layer addresses. If the decision is affirmative at step 77, flow proceeds to step 80 to transmit a frame to the destination, and flow returns to the starting point of the routine. Otherwise, flow proceeds from step 77 to step 78 to broadcast an ARP request packet to the network to obtain a response from the target host giving its data link layer address. Other hosts on the network receiving the query do not reply. If the data link layer address of the destination or a router (gateway) is obtained at step 79, flow proceeds to step 80. Otherwise, flow returns to the starting point of the routine. The returned data link layer address is then cached by the host for use in sending future packets to the destination.

The main routine of FIG. 8 is periodically interrupted to initiate a timer interrupt routine to check the validity of each entry of the routing table, as shown in FIG. 9. At step 91, a variable R indicating the number of entries created in the routing table is set equal to 1. At step 92, the time value in the cache period of the entry R is checked to see if it has decremented to zero. If so, flow proceeds from step 92 to step 93 to delete the entry R The variable R is then incremented by 1 at step 95 if all the entries still have not been tested (step 94), and flow returns to step 92 to repeat the process until all the entries are tested. As a result, the routing table only contains most recent address data.

Figure 10:
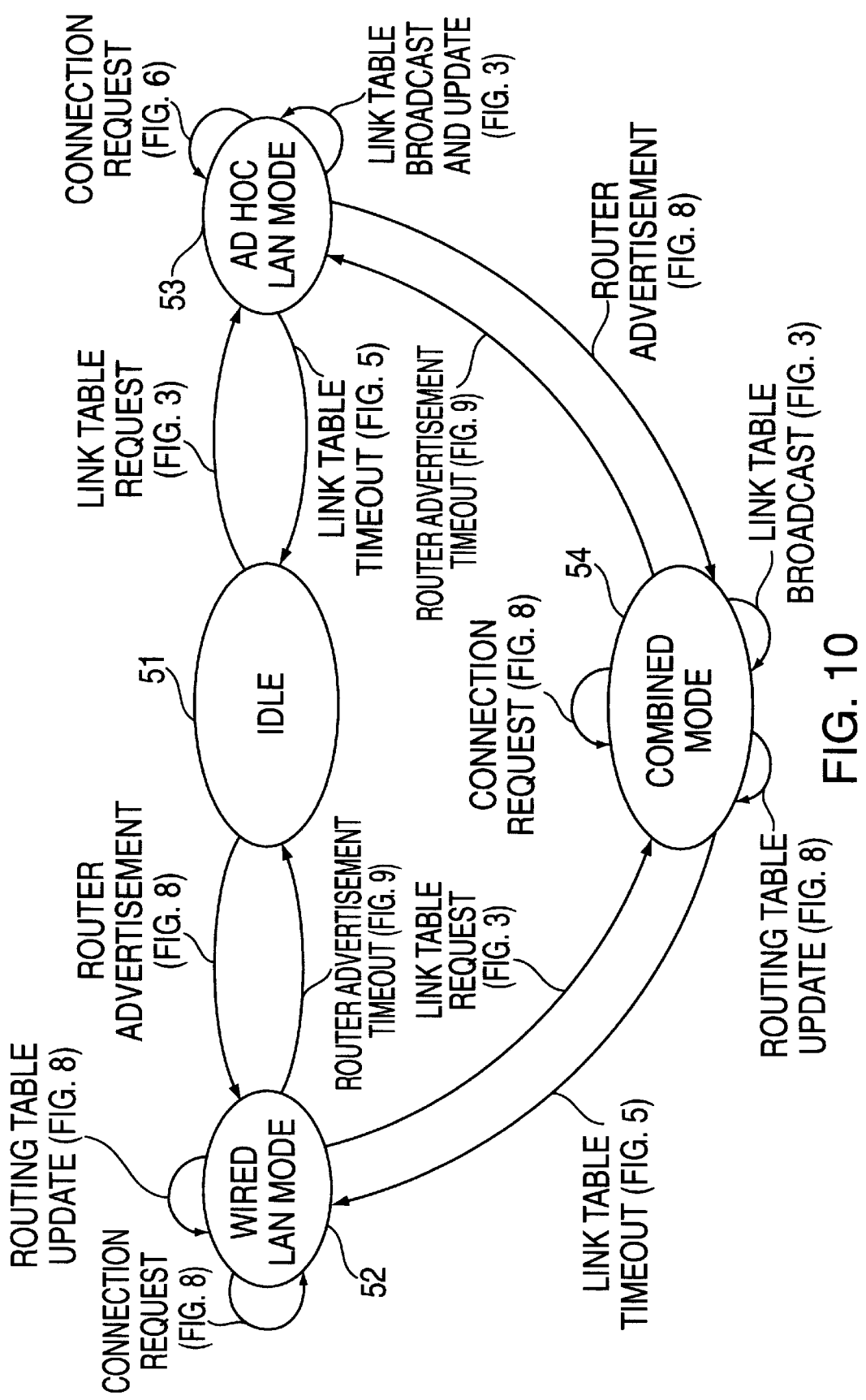
FIG. 10 is a state transition diagram illustrating the transition of states of a mobile host within the combined ad hoc and wired LAN environment.

Overall operation of the mobile host according to the flowcharts of FIGS. 8 and 9 is illustrated in the state transition diagram of FIG. 10.

When the mobile host 11, for example, is powered on, it stays in an idle state S1. During state S1, if the mobile host 11 establishes the wireless link 25 to the wired LAN 20, it waits for a router advertisement message, and if it further establishes the wireless link 16 to mobile hosts 12, 13, it broadcasts a link table request (FIG. 3). If a router advertisement message is received (FIG. 8) during state S1, the mobile host 11 updates its routing table and leaves state S1 and enters state S2 (wired LAN mode). If a link table request is broadcast during state S1 from the mobile host 11, it receives a link table and saves it in memory and leaves state S1 and enters state S3 (ad hoc LAN mode).

During state S2, if the mobile host receives a connection request (when a destination host name is entered) for a destination in the wired LAN 20, it executes the routine of FIG. 8 to establish a connection using the routing table and updates its routing table whenever it receives a router advertisement message. If the mobile host 11 further establishes the wireless link 16 to mobile hosts 12, 13, it broadcasts a link table request and receives a link table and saves it in memory and leaves state S2 and enters state S4 (combined mode). If the router advertisement cache (timeout) period expires (FIG. 9), the mobile host 11 returns to idle state S1.

During state S4, the routing table is updated with router advertisement messages and the link table is broadcast and updated according to the routine of FIG. 3 and a connection is established according to the routine of FIG. 8. If the link table cache (timeout) period expires (FIG. 5), the mobile host 11 returns to state S2, and if the router advertisement cache period expires, it moves to ad hoc state S3.

During state S3, the link table is broadcast and updated according to the routine of FIG. 3 and a connection is established according to the routine of FIG. 6. If a router advertisement message is received, the mobile host 11 updates its routing table and moves to state S4. If the link table cache period expires during state S3, the mobile host 11 returns to state S1.

What is claimed is:

1. An ad hoc network comprising:

a plurality of mobile hosts interconnectable by a plurality of wireless links, each of the mobile hosts comprising:

a link table comprising a plurality of entries each containing a host name, a link identifier indicating one of the wireless links, a network layer address and a data link layer address, each of the mobile hosts being responsive to an entered destination host name for detecting one of the entries in which the destination host name is contained, transmitting a frame containing the network layer and data link layer addresses of said one entry on one of the wireless links which is indicated by the link identifier of said one entry.

2. An ad hoc network comprising:

a plurality of mobile hosts interconnectable by a plurality of wireless links, each of the mobile hosts comprising:

a link table having a plurality of entries each comprising a host name, a link identifier indicating one of the wireless links, a network layer address and a data link layer address; and the mobile host being responsive to an entered destination host name for making a search through the link table, transmitting a frame containing the network layer and data link layer addresses of one of the entries on one of the wireless links which is indicated by the link identifier of said one entry if said one entry contains the destination host name, scanning the wireless links if the link table does not contain the destination host name, broadcasting a link table request message on one of the scanned wireless links, receiving a remote link table containing the destination host name, and transmitting a frame containing network layer and data link layer addresses of the received link table on one of the scanned wireless links on which the remote link table was received.

3. An ad hoc network as claimed in claim 2, wherein each of the mobile hosts is arranged to:

start measuring a time lapse, broadcast the link table of the mobile host when the measured time lapse equals a random value, and stop measuring the time lapse and receive a broadcast link table from another mobile host if the broadcast link table arrives before the time lapse equals the random value.

4. An ad hoc network as claimed in claim 3, wherein each of the mobile hosts is arranged to:

set a timeout value into an entry of the link table when the link table is updated, and delete the entry from the link cable if the timeout value of the entry expires.

5. An ad hoc network as claimed in claim 2, wherein each of the mobile hosts is arranged to:

establish a wireless link to a wired network, receive a router advertisement message from the wired network at periodic intervals, update a routing table with data of the received router advertisement message;

make a search through the link table in response to the entered destination host name, transmit a frame according to data of an entry of the link table if the entry contains the destination host name, and transmit a frame according to the routing table if no frame is transmitted to other mobile hosts of the ad hoc network.

6. An ad hoc network as claimed in claim 5, wherein each of the mobile hosts is arranged to:

set a timeout value into an entry of the routing table when the routing table is updated, and delete the entry from the routing table if the timeout value of the entry expires.

7. A method of operating an ad hoc network, wherein the network comprises a plurality of mobile hosts interconnectable by a plurality of wireless links, and each of the mobile hosts includes a link table having a plurality of entries each comprising a host name, a link identifier indicating one of the wireless links, a network layer address and a data link layer address, the method comprising the steps of:

detecting one of the entries in which an entered destination host name is contained; and transmitting a frame containing the network layer and data link layer addresses of said one entry on one of the wireless links which is indicated by the link identifier of said one entry.

8. A method of operating an ad hoc network, wherein the network comprises a plurality of mobile hosts interconnectable by a plurality of wireless links, and each of the mobile hosts includes a link table comprising a plurality of entries each containing a host name, a link identifier indicating one of the wireless links, a network layer address and a data link layer address, the method comprising the steps of:

making a search through the link table in response to a destination host name entered on a mobile host of the plurality of mobile hosts;

transmitting, from the mobile host, a frame containing network layer and data link layer addresses of one of the entries if said one entry contains the destination host name;

scanning the wireless links if the link table does not contain the destination host name; and broadcasting a link table request message on one of the scanned wireless links, receiving a link table of the destination host name, and transmitting a frame containing network layer and data link layer addresses contained in an entry of the received link table on one of the scanned wireless links on which the link table was received.

9. The method of claim 8, further comprising the steps of:

a) starting a random-interval timer at each of the mobile hosts;

b) broadcasting entry data of the mobile host when the timer expires;

c) stopping the timer and receiving a broadcast link table from another mobile host if the broadcast link table arrives before the timer expires;

d) updating the link table of the mobile host with the received link table;

e) introducing a fixed time interval; and f) repeating steps (a) to (d).

10. The method of claim 8, further comprising the steps of:

setting a timeout value into an entry of the link table when the link table is updated by step (d), and deleting the entry from the link table if the timeout value of the entry expires.

11. The method of claim 8, further comprising the steps of:

establishing a wireless link to a wired network;

receiving a router advertisement message from the wired network at periodic intervals;

updating a routing table with the received router advertisement message; and transmitting a frame according to the routing table if no frame is transmitted to other mobile hosts of the ad hoc network.

12. The method of claim 11, further comprising the steps of:

setting a timeout value into an entry of the routing table when the routing table is updated, and deleting the entry from the routing table if the timeout value of the entry expires.

13. The method of claim 8, further comprising the steps of:

a) establishing a wireless link to at least one mobile host;

b) starting a random-interval timer;

c) broadcasting a link table request message onto the wireless link when the timer expires and receiving a link table from another mobile host;

d) updating the link table with the received link table;
e) introducing a fixed time interval;
f) stopping the random-interval timer and receiving a link table request message from another mobile host if the link table request message arrives before the timer expires;
g) starting the random-interval timer,
h) broadcasting a link table when the timer expires;
i) stopping the timer and receiving a broadcast link table from another mobile host if the broadcast link table arrives before the timer expires; and
j) repeating steps (d) to (i).

* * * * *